United States
Aday, Jr. et al.

[11] 3,932,752
[45] Jan. 13, 1976

[54] GAMMA COUNTER SHUTTER ASSEMBLY

[75] Inventors: Roy W. Aday, Jr., La Habra; Duane G. Barber, Yorba Linda, both of Calif.

[73] Assignee: Beckman Instruments, Inc., Fullerton, Calif.

[22] Filed: Feb. 19, 1974

[21] Appl. No.: 443,782

[52] U.S. Cl. ............. 250/328; 250/303; 250/506
[51] Int. Cl. .................................... G01t 1/20
[58] Field of Search .......... 250/303, 328, 515, 506, 250/507

[56] References Cited
UNITED STATES PATENTS

| | | | |
|---|---|---|---|
| 3,610,927 | 10/1971 | Husser | 250/328 |
| 3,626,190 | 12/1971 | Cannon | 250/328 |
| 3,663,816 | 5/1966 | Scherzer | 250/328 |

*Primary Examiner*—Harold A. Dixon
*Attorney, Agent, or Firm*—R. J. Steinmeyer; R. R. Meads

[57] ABSTRACT

A shutter assembly for a radioactivity measuring apparatus having a sample counting chamber, the assembly having a bulky solid lead cylinder with a sample access port extending therethrough for alignment with the sample chamber. The cylinder is rotated by a Geneva wheel arrangement having a drive wheel with a plurality of equi-angularly disposed pins perpendicular to the surface thereof engaging radially extending open-ended slots in a driven wheel secured to the lead cylinder for concurrent rotation therewith. The drive wheel is rotated at a constant speed with the driven wheel accelerating as a pin traverses the slot from the open end toward the driven wheel center and then decelerating as the pin traverses the reverse direction to provide precise positioning with adjacent pins engaging the open ends of adjacent slots in the stop position of the cylinder.

8 Claims, 3 Drawing Figures

GAMMA COUNTER SHUTTER ASSEMBLY

BACKGROUND OF THE INVENTION

This invention relates to a shutter assembly, and more particularly to a shutter assembly for an automatic gamma counting instrument.

In radioactivity analyzing systems, such as gamma counting systems, the trend has been toward automatic systems wherein a plurality (sometimes 300 or more) radioactive samples traverse a common plane by such means as a link chain conveyor (see U.S. Pat. No. 3,604,935), the conveyor being automatically incremented to place a vial containing a sample in position for lowering into a sample counting chamber. The sample so counted is then elevated and the next sample in sequence is then lowered into the counting chamber. As the number of samples handled by the automatic counting apparatus increase, the probability of the counting chamber receiving spurious signals from the samples not being counted substantially increases.

In beta counting instruments a disc member has often been employed for rotation (see U.S. Pat. No. 3,626,190) about an axis parallel to the counting chamber axis, the disc being of relatively thin construction with an aperture extending therethrough for positioning in alignment with the sample chamber during insertion of a sample and out of alignment with the sample chamber during the measuring cycle. However, such discs are not effective for radioactivity or gamma counting instruments. Ideally, to provide effective shielding to the sample chamber during the counting process in a gamma instrument, solid lead of substantial configuration must be used. With such large lead shutters, problems associated with moving and precisely positioning the lead shutters have been encountered due to the high inertial forces encountered with a large moving mass.

SUMMARY OF THE INVENTION

Accordingly, it is an object of this invention to provide a new and improved shutter assembly.

It is another object of this invention to provide a shutter assembly utilizing a substantially configured lead cylinder in a radioactivity analyzing system.

It is a further object of this invention to provide a drive system for the shutter assembly minimizing the inertial force problem associated with a bulky cylindrical mass.

The foregoing and other objects of the invention are accomplished by providing a cylindrical lead shutter adapted for rotation about an axis parallel to the sample counting chamber of the radioactivity analyzing instrument. The shutter is provided with an access port positionable between a first position in alignment with the sample chamber and a second diametrically opposed position out of alignment with the sample chamber during the counting or radioactivity measuring cycle. The shutter is connected by means of a shaft to a driven wheel of a Geneva wheel arrangement, the driven wheel having a plurality of equi-angularly displaced radially extending slots formed therein, the slots being open ended adjacent the periphery of the driven wheel. The drive wheel of the Geneva wheel arrangement is positioned parallel to and beneath the driven wheel, the drive wheel having a plurality of equi-angularly positioned pins disposed perpendicular to the surface thereof for engaging the radially extending slots of the driven wheel. Adjacent pin positions are such that two adjacent pins engage the open ends of adjacent slots in the driven wheel in the stop position of the cylindrical shutter. The drive wheel of the Geneva wheel arrangement is coupled through a conventional gear reduction system to a permanent magnet drive motor which rotates at constant speed, the driven wheel accelerating as a pin traverses the slot from the open end toward the driven wheel center and then decelerating as the pin traverses the reverse direction to provide precise positioning of the cylindrical shutter in the stop position with adjacent pins engaging the open ends of adjacent slots.

The novel features which are believed to be characteristic of the invention are set forth with particularity in the specification which can best be understood by reference to the following description taken in conjunction with the accompanying drawings.

DESCRIPTION OF THE PREFERRED EMBODIMENT

Figure 1:
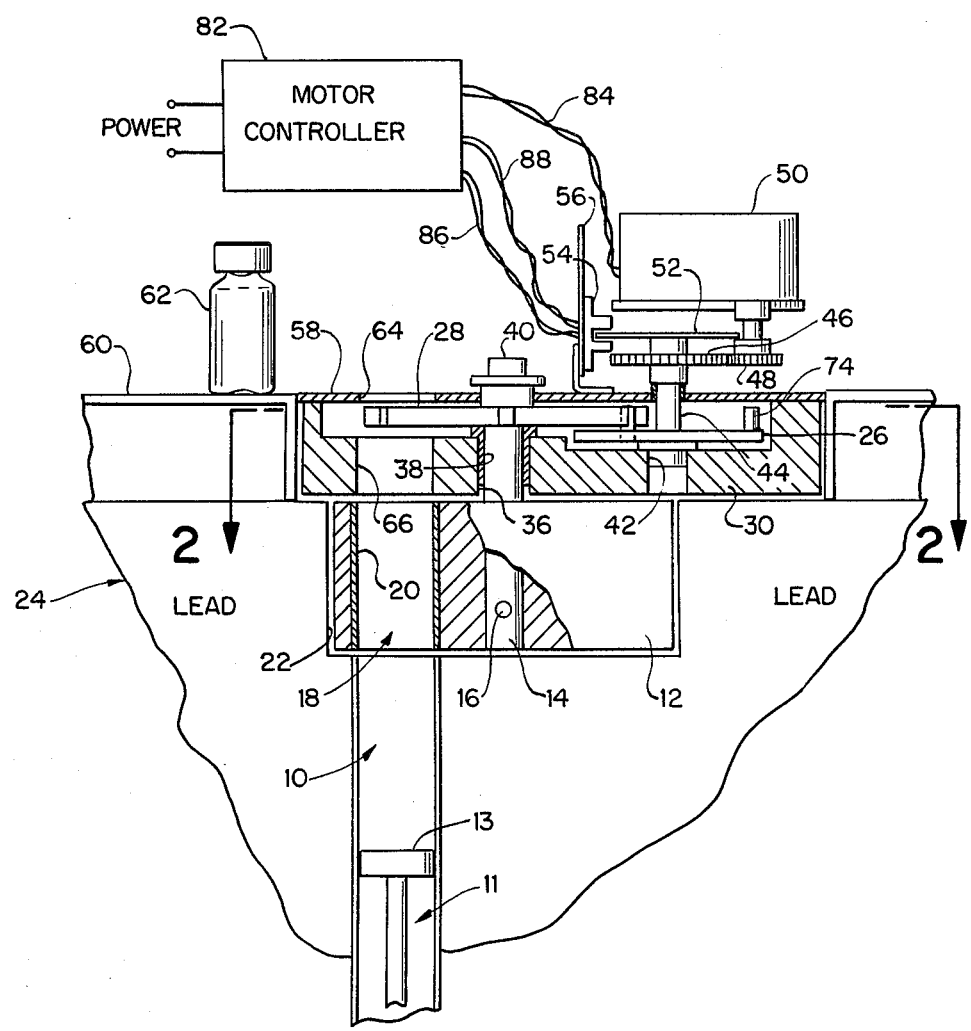
FIG. 1 is a front view partially sectioned, of the shutter assembly according to the invention.

Referring now to the drawing and particularly to FIG. 1, there is shown a portion of a radioactivity analyzer with a shutter assembly in proximity to a sample counting chamber 10. Mounted for rotation immediately above the sample counting chamber 10 is a lead cylinder or shutter 12 adapted for rotation about an axis or shaft 14 which is offset from the axis of the counting chamber 10 and parallel thereto, the diameter of shutter 12 being such that the periphery thereof extends beyond chamber 10. The lead shutter 12 is secured to the shaft 14 by means of a locking pin 16 extending through the shutter and through the shaft.

Extending between the parallel surfaces of shutter 12 is an aperture 18 parallel to the shaft 14 and positioned for alignment with counting chamber 10. The aperture or access port 18 has a sleeve lining 20 which, for example, can be made from a polycarbonate plastic material of low radioactive content. The lead shutter 12 rotates within a cavity 22 formed in the lead shielding material 24 which generally surrounds the sample counting chamber 10 and the radiation measuring means (not shown). The cavity 22 is generally cylindrical in form to receive the shutter 12 with close tolerance to provide maximum shielding.

The shutter 12 is a bulky lead structure which can have typical dimensions of 2 inches thick by 4½ inches in diameter with the aperture 18 being approximately 1¼ inches. The total weight of the shutter 12 is between 12 and 15 pounds which thereby creates a high inertial force upon rotation, rendering precise positioning of the aperture 18 in alignment with the counting chamber 10 a problem, especially if the diameter of the access port 18 is to be kept within close tolerance limits to provide maximum lead shielding with a sample in the counting chamber 10. The rotation of the shutter 12 occurs with two positions, that shown in FIG. 1 and a second position in which the access port 18 is diametrically opposite the illustrated position.

To overcome the problems of high inertia, the drive mechanism of the shutter assembly employs a Geneva wheel arrangement (see also FIG. 2) which includes a drive wheel 26 coacting with a driven wheel 28 secured to the same shaft 14 as the lead shutter 12.

Figure 2:
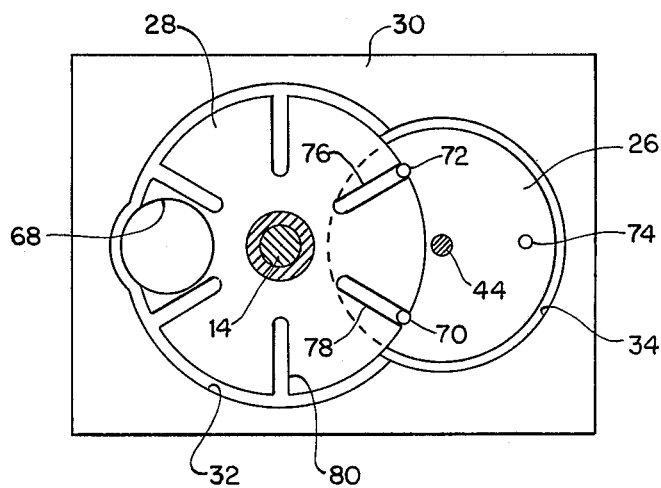
FIG. 2 is a plan view taken along line 2-2 of FIG. 1.
Figure 3:
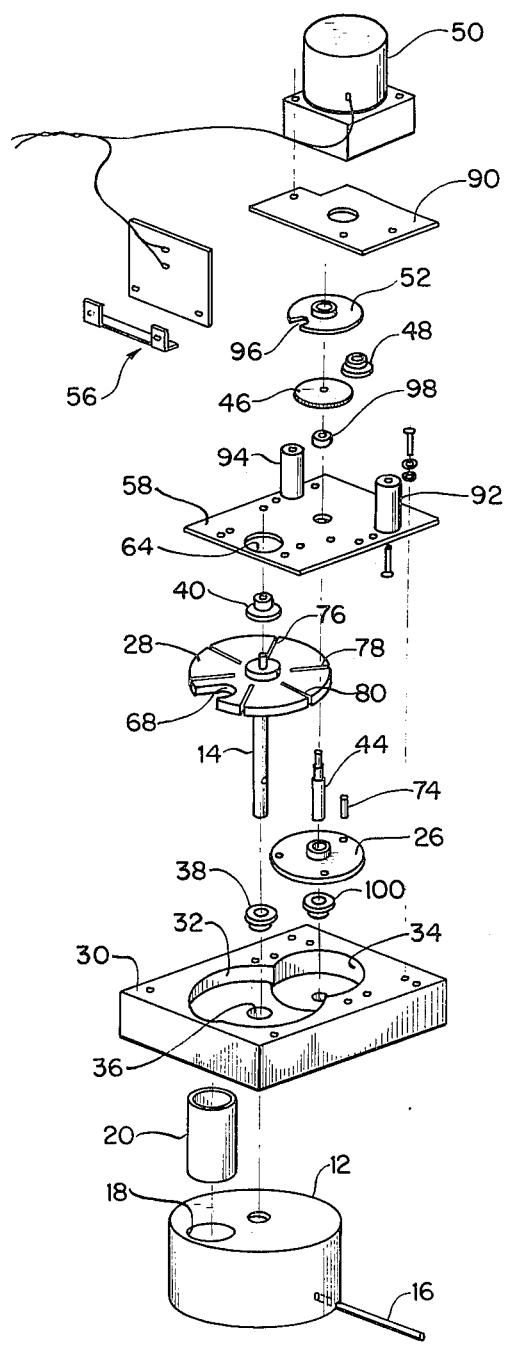
FIG. 3 is an exploded isometric view of the shutter assembly of FIG. 1.

As shown in FIGS. 1, 2 and 3, the Geneva wheel arrangement is mounted within a shutter housing 30 which has a first circular recess 32 of a diameter slightly larger than the driven wheel 28 and a second circular recess 34 overlapping and deeper than the first recess 32. As seen in FIG. 2, the shaft 14 and shutter 12 are suspended through an aperture 36 by means of a thrust bearing 38 encircling the shaft 14 with the driven wheel 28 being secured to the shaft 14 by suitable means, such as a spring pin fastener 40.

The drive wheel 26 is also secured to the housing 30 by means of a bearing 42 positioned within a centrally located aperture in recess 34, with the surface of drive wheel 26 parallel to and beneath driven wheel 28. Upwardly extending from drive wheel 26 is a shaft 44 having secured to the upper end thereof a gear 46 coacting with a smaller gear 48 operating from the shaft of motor 50. Gears 46 and 48 are selected to provide a 2:1 speed reduction from the motor to the drive wheel 26. The motor 50 is an alternating current permanent magnet motor, selected for the characteristic that such motors stop very rapidly when the voltage is removed.

Also secured to shaft 44 is a sensing disc 52 which is basically an aluminum disc with a sensing aperture or slot 96 (see FIG. 3) adjacent the outer edge thereof. As shaft 44 turns sensing aperture 96 in the disc 52 passes by a sensing device 54 attached to an L-shaped bracket mounted printed circuit board 56 secured to the housing top plate 58 which covers the shutter housing 30. The sensing device 54 is generally U-shaped with the disc 52 passing through the open end of the U, the lower arm of the U-shaped photosensing means 54 having, for example, a light source with the upper arm thereof having a photosensitive device actuable upon impingement of light on the surface thereof.

The housing top plate 58 is flush with the adjacent sample conveying platform 60 over which sample containers 62 pass enroute to a sample loading hole 64 in housing top plate 58, the sample loading hole 64 being in alignment with a sample loading aperture 66 within housing 30 and further in alignment with access port 18 of shutter 12 and sample counting chamber 10. As can be seen in FIG. 2, the driven wheel 28 is also provided with an arcuate cut out 68 for passage of the sample 62 therethrough in the loading position.

Referring now particularly to FIGS. 1 and 2, the details of the Geneva wheel arrangement will be described. The drive wheel 26 is provided with three upwardly extending pins 70, 72 and 74 positioned on a like radius from the shaft 44 and equi-angularly disposed about the circumference 120° apart. The pins are press fit into apertures within the drive wheel 26 with the radius of the pins from the shaft 44 being selected so that (as viewed in FIG. 2) pins 70 and 72 have the centers thereof coincident with the outer circumference of driven wheel 28. Driven wheel 28 is provided with a plurality of radially extending slots, three of which are numbered 76, 78 and 80, respectively, the slots having a radial length sufficient to permit full travel of one of the pins 70, etc., into and out of the slot as drive wheel 26 rotates. Furthermore, the slots are open at the circumference of driven wheel 28 to permit entry of the pins in sequential fashion into the coacting slot. Six such slots are shown to provide a further 2:1 reduction in speed from the drive wheel 26 to the driven wheel 28 and ultimately the shutter 12. The slots 70, 72, etc., are equi-angularly disposed 60° apart with one segment between adjacent slots being cut away as shown at 68 to provide sample access to the counting chamber 10.

The advantage of the Geneva wheel arrangement is to prevent high inertial force build-up in the shutter 12. Viewing FIG. 2 and assuming a clockwise rotation of drive wheel 26, pin 70 commences its travel down slot 78 with the speed of driven wheel 28 in the counterclockwise direction gradually increasing until the pin 70 is located on a line between shaft 14 and shaft 44. As drive wheel 26 continues rotating, pin 70 begins traversing slot 78 outwardly to the open end with the rotating speed of driven wheel 28 decelerating as pin 70 reaches the position previously occupied by pin 72 in FIG. 2. At this point, pin 74 is now commencing engagement with slot 80 in the same position illustrated by pin 70 within slot 78. The drive wheel 26 rotates one complete turn until pins 70 and 72 are in the same position as illustrated in FIG. 2 with the cutaway segment 68 positioned 180° from its original loading position. Consequently, as a result of this arrangement driven wheel 28 along with shutter 12 will encounter three acceleration-deceleration cycles for one complete rotation of drive wheel 26, thereby precluding high inertial force build-up in the shutter 12.

As shown in FIG. 1, a motor controller 82 is connected to a source of alternating current power to drive motor 50 by means of conductors 84 and to provide power to the light source of sensing device 54 by means of conductors 86 and also to receive the signal from the photosensitive device by means of conductors 88. The motor controller 82 will contain sequencing electronics also coupled to the conveyor means (not shown) to first position driven wheel 28 with the access cutaway segments 68 in alignment with the counting chamber 10, whereupon a sample 62 is passed into alignment with the counting chamber 10 with the elevator mechanism 11 in the raised position in alignment with housing top plate 58, the platform 13 associated with the elevator means 11 coacting with the bottom surface of sample 62. The sample 62 is then lowered into the counting chamber 10, this condition being sensed and transmitted to the motor controller 82 to initiate power over conductors 84 to thereby energize motor 50. At this point, the sensing aperture 96 of disc 52 is in alignment with the photosensing means 54 and normal delay circuitry is provided to permit motor 50 energizing means to latch and hold for one rotational cycle of drive wheel 26. As drive wheel 26 completes one rotation, the sensing aperture 96 passes between the jaws of photosensing means 54 to provide a signal over conductors 88 indicative of the 180° rotation drive wheel 28 along with shutter 12, at which position motor 50 is de-energized, and being of a permanent magnet type, stops very rapidly when the voltage is removed. At this particular location pins 70 and 72 of drive wheel 26 are engaging the slots diametrically opposite slots 76 and 78 respectively of driven wheel 28 with the cutaway segment 68 positioned between the pins 70 and 72. The radial displacement of pins 70 and 72 is such that the driven wheel 28 and shutter 12 are locked in position by pins 70 and 72. At this point the de-energization of motor 50 is sensed by the motor controller which then energizes the sample counting mechanism for the time duration selected to measure the radioactive content of the sample. At the conclusion of the sample counting mechanism the motor controller then receives a signal to energize motor 50 to rotate drive wheel 26 one complete revolution and driven wheel one-half revolution with the result being the locking of driven wheel 28 in the position shown in FIG. 2 by means of pins 70 and 72 to thereby prevent the shutter 12 from partially blocking the sample entrance hole. As previously explained, the radius of the displacement of the pins 70, 72 and 74 from the center of shaft 44 is such that the centers of the pins are in alignment with the outer circumference of driven wheel 28 so that two adjacent pins perform the locking function.

Further structural details are more fully shown in FIG. 3, this basically relating to the mounting of motor 50 to a motor mounting plate 90 which is secured to housing top plate 58 by means of spacers 92 and 94. Also the segmented disc 52 is better illustrated showing the sensing aperature 96 in better detail. Additional structure such as bearing 98 and bearing 100 are also shown for mounting shaft 44 within recess 34.

While there has been shown and described a preferred embodiment, it is to be understood that various other adaptations and modifications may be made within the spirit and scope of the invention.

What is claimed is:

1. A radioactivity measuring system having a sample counting chamber and means for inserting a sample into and removing the sample from the counting chamber through an entrance thereof comprising:
   a high inertia shutter impervious to radioactive emissions and mounted over the entrance to the sample counting chamber and rotatable between first and second shutter positions which, respectively, open and close the sample chamber entrance, the shutter having a sample access port extending therethrough which, in the first shutter position, is aligned with the sample chamber entrance to permit insertion and removal of the sample into and out of the sample chamber; and
   drive means for rotating the shutter between the first and second shutter positions including cooperating driven and drive members rotatable about parallel axes, the driven member being coupled to the shutter and having a radial slot therein, the drive member including a drive element radially offset from the axis of rotation of the drive member and sliding radially inward and outward of the slot with rotation of the drive member to accelerate and then decelerate the driven member and hence t shutter in response to rotation of the drive member and to loc the shutter in place when the drive member is stopped.

2. The system of claim 1 including radioactivity shielding means substantially surrounding the sample chamber and having a recess therein situated at the sample chamber entrance, the shutter being supported within the recess for rotation between the first and second shutter positions.

3. The system of claim 1 wherein the drive means cyclically accelerates and decelerates the shutter during rotation between the first and second shutter positions.

4. The system according to claim 1 wherein the driven member includes a plurality of equi-angularly disposed radial slots and the drive element comprises a pin for engaging successive ones of said slots.

5. The system of claim 4 wherein the drive member includes a plurality of equi-angularly disposed pins for engaging successive ones of the slots.

6. The system of claim 5 wherein the number and position of the pins and slots is such that with the shutter in either of its first or second shutter positions at least two pins engage two corresponding slots.

7. The system according to claim 5 wherein the second shutter position is displaced 180° from the first shutter position.

8. The system according to claim 5 wherein the driven member is disposed generally parallel to the shutter and includes a sample passage therethrough between two adjacent slots aligned with the access port through the shutter.

* * * * *

UNITED STATES PATENT OFFICE
CERTIFICATE OF CORRECTION

Patent No. 3,932,752        Dated  January 13, 1976

Inventor(s) Roy W. Aday, Jr. and Duane G. Barber

It is certified that error appears in the above-identified patent and that said Letters Patent are hereby corrected as shown below:

Column 6, line 10, after "hence" delete "t" and insert "the".

Column 6, line 12, delete "loc" and insert "lock".

Signed and Sealed this twenty-third Day of March 1976

[SEAL]

Attest:

RUTH C. MASON
Attesting Officer

C. MARSHALL DANN
Commissioner of Patents and Trademarks